(12) United States Patent
Sprague

(10) Patent No.: US 8,797,258 B2
(45) Date of Patent: Aug. 5, 2014

(54) HIGHLIGHT COLOR DISPLAY ARCHITECTURE USING ENHANCED DARK STATE

(75) Inventor: Robert A. Sprague, Saratoga, CA (US)

(73) Assignee: SiPix Imaging, Inc., Fremont, CA (US)

( * ) Notice: Subject to any disclaimer, the term of this patent is extended or adjusted under 35 U.S.C. 154(b) by 296 days.

(21) Appl. No.: 12/644,861

(22) Filed: Dec. 22, 2009

(65) Prior Publication Data

US 2010/0165005 A1     Jul. 1, 2010

Related U.S. Application Data

(60) Provisional application No. 61/141,574, filed on Dec. 30, 2008.

(51) Int. Cl.
*G09G 5/10* (2006.01)
*G02F 1/167* (2006.01)

(52) U.S. Cl.
USPC .............................. 345/107; 345/105; 345/84

(58) Field of Classification Search
CPC ..................................................... G09G 3/344
USPC ............. 345/690, 296, 84, 87, 105, 204–205; 359/296
See application file for complete search history.

(56) References Cited

U.S. PATENT DOCUMENTS

| | | | |
|---|---|---|---|
| 3,756,693 A | 9/1973 | Ota |
| 3,892,568 A | 7/1975 | Ota |
| 4,298,448 A | 11/1981 | Muller et al. |
| 5,378,574 A | 1/1995 | Winnik et al. |
| 5,980,719 A | 11/1999 | Cherukuri et al. |
| 6,198,809 B1 | 3/2001 | Disanto et al. |
| 6,337,761 B1 | 1/2002 | Rogers et al. |
| 6,373,461 B1 | 4/2002 | Hasegawa et al. |
| 6,486,866 B1 | 11/2002 | Kuwahara et al. |
| 6,525,866 B1 | 2/2003 | Lin et al. |
| 6,538,801 B2 | 3/2003 | Jacobson et al. |
| 6,600,534 B1 | 7/2003 | Tanaka et al. |

(Continued)

FOREIGN PATENT DOCUMENTS

| | | |
|---|---|---|
| EP | 1 089 118 | 4/2001 |
| WO | WO 99/53373 | 10/1999 |

(Continued)

OTHER PUBLICATIONS

U.S. Appl. No. 13/038,255, Mar. 1, 2011, Sprague.

(Continued)

*Primary Examiner* — Andrew Sasinowski
(74) *Attorney, Agent, or Firm* — Perkins Coie LLP

(57) ABSTRACT

The present invention is directed to a highlight color display. One of the key features of the invention is the dark color of the display fluid filled in the microcups, which allows the dark state to appear black. There is no alignment required between the pixel electrodes and the microcups. In practice, a standard active matrix array may be used to drive the display device.

12 Claims, 12 Drawing Sheets

(56) References Cited

U.S. PATENT DOCUMENTS

| | | | |
|---|---|---|---|
| 6,650,462 B2 * | 11/2003 | Katase | 359/296 |
| 6,693,620 B1 | 2/2004 | Herb et al. | |
| 6,704,133 B2 | 3/2004 | Gates et al. | |
| 6,724,521 B2 | 4/2004 | Nakao et al. | |
| 6,729,718 B2 | 5/2004 | Goto et al. | |
| 6,751,007 B2 | 6/2004 | Liang et al. | |
| 6,829,078 B2 * | 12/2004 | Liang et al. | 359/296 |
| 6,864,875 B2 | 3/2005 | Drzaic et al. | |
| 6,930,818 B1 | 8/2005 | Liang et al. | |
| 6,967,762 B2 | 11/2005 | Machida et al. | |
| 6,987,503 B2 | 1/2006 | Inoue | |
| 7,009,756 B2 | 3/2006 | Kishi et al. | |
| 7,038,655 B2 | 5/2006 | Herb et al. | |
| 7,038,670 B2 | 5/2006 | Liang et al. | |
| 7,046,228 B2 | 5/2006 | Liang et al. | |
| 7,050,218 B2 | 5/2006 | Kanbe | |
| 7,075,502 B1 | 7/2006 | Drzaic et al. | |
| 7,226,550 B2 * | 6/2007 | Hou et al. | 252/500 |
| 7,271,947 B2 * | 9/2007 | Liang et al. | 359/296 |
| 7,283,119 B2 | 10/2007 | Kishi | |
| 7,283,199 B2 | 10/2007 | Aichi et al. | |
| 7,342,556 B2 | 3/2008 | Oue et al. | |
| 7,365,732 B2 | 4/2008 | Matsuda et al. | |
| 7,411,719 B2 * | 8/2008 | Paolini et al. | 359/296 |
| 7,417,787 B2 | 8/2008 | Chopra et al. | |
| 7,545,557 B2 | 6/2009 | Iftime et al. | |
| 7,548,291 B2 | 6/2009 | Lee et al. | |
| 7,679,599 B2 | 3/2010 | Kawai | |
| 7,686,463 B2 | 3/2010 | Goto | |
| 7,760,419 B2 | 7/2010 | Lee | |
| 7,808,696 B2 | 10/2010 | Lee et al. | |
| 7,830,592 B1 | 11/2010 | Sprague et al. | |
| 8,115,729 B2 | 2/2012 | Danner et al. | |
| 8,120,838 B2 | 2/2012 | Lin et al. | |
| 8,159,636 B2 | 4/2012 | Sun et al. | |
| 8,237,892 B1 | 8/2012 | Sprague et al. | |
| 8,395,836 B2 | 3/2013 | Lin | |
| 2002/0033792 A1 | 3/2002 | Inoue | |
| 2002/0171620 A1 | 11/2002 | Gordon et al. | |
| 2003/0002132 A1 * | 1/2003 | Foucher et al. | 359/296 |
| 2003/0095094 A1 | 5/2003 | Goden | |
| 2003/0107631 A1 | 6/2003 | Goto et al. | |
| 2003/0132908 A1 | 7/2003 | Herb et al. | |
| 2004/0051935 A1 | 3/2004 | Katase | |
| 2004/0113884 A1 | 6/2004 | Albert et al. | |
| 2004/0136048 A1 | 7/2004 | Arango et al. | |
| 2004/0190115 A1 * | 9/2004 | Liang et al. | 359/296 |
| 2004/0263947 A1 | 12/2004 | Drzaic et al. | |
| 2005/0151709 A1 | 7/2005 | Jacobson et al. | |
| 2005/0190431 A1 | 9/2005 | Matsuda | |
| 2006/0197738 A1 | 9/2006 | Kawai | |
| 2007/0080928 A1 * | 4/2007 | Ishii et al. | 345/107 |
| 2007/0268556 A1 | 11/2007 | Chopra et al. | |
| 2008/0042928 A1 | 2/2008 | Schlangen et al. | |
| 2008/0174531 A1 * | 7/2008 | Sah | 345/84 |
| 2009/0034054 A1 | 2/2009 | Ikegami et al. | |
| 2009/0213452 A1 | 8/2009 | Lin et al. | |
| 2009/0251763 A1 | 10/2009 | Sprague et al. | |
| 2009/0273827 A1 | 11/2009 | Lin et al. | |
| 2010/0053728 A1 | 3/2010 | Lin et al. | |
| 2010/0103502 A1 | 4/2010 | Jacobson et al. | |
| 2010/0165448 A1 | 7/2010 | Sprague | |
| 2011/0292094 A1 | 12/2011 | Lin | |
| 2012/0007897 A1 | 1/2012 | Yang et al. | |
| 2012/0307346 A1 | 12/2012 | Sprague | |
| 2013/0057942 A1 | 3/2013 | Wang et al. | |

FOREIGN PATENT DOCUMENTS

| | | |
|---|---|---|
| WO | WO 01/67171 | 9/2001 |
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/092,052, Apr. 21, 2011, Sprague et al.

Allen, K. (Oct. 2003). Electrophoretics Fulfilled. *Emerging Displays Review: Emerging Display Technologies, Monthly Report—Octomber 2003*, 9-14.

Bardsley, J.N. & Pinnel, M.R. (Nov. 2004) Microcup™ Electrophoretic Displays. *USDC Flexible Display Report*, pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Application and the Dynamics of Companies. *TRI*. 1-10. (In Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C.,& Liang, R.C. (Dec. 2003). *Microcup ® Electronic Paper by Roll-to-Roll Manufacturing Processes*. Presentation conducted at FEG, Nei-Li, Taiwan.

Ho, Candice. (Feb. 2, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, P4-3. (Int'l Conference on Consumer Electronics, Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Lee, H., & Liang, R.C. (Jun. 2003) SiPix Microcup® Electronic Paper—An Introduction. *Advanced Display*, Issue 37 , 4-9 (in Chinese, English abstract attached).

Liang, R.C. (Feb. 2003) *Microcup® Electrophoretic and Liquid Crystal Displays by Roll-to-Roll Manufacturing Prccesses*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by A Roll-to-Roll Manufacturing Process*. Paper presented at the IDMC, Taipei, Taiwan.

(56) References Cited

OTHER PUBLICATIONS

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by A Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) <<Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3. (in Japanese, with English translation).

Sprague, R.A. (Sep. 23, 2009) SiPix Microcup Electrophoretic Epaper for Ebooks. *NIP 25 Technical Programs and Proceedings*, 2009 pp. 460-462.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract)..

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Elecyrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS& T Electronic Imaging, SPIE* vol. 5289, 102-108.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Oct. 2003). *Microcup ® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., (Sep. 2006) *Monochrome and Area Color Microcup®EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, F., Kang, Y.M., Chen, Y., and Lin, W. (Jul. 2007) *Microcup® e-Paper for Embedded and Flexible Designs*. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

U.S. Appl. No. 13/225,184, Sep. 2, 2011, Want et al.
U.S. Appl. No. 13/300,178, Nov. 18, 2011, Sprague et al.
U.S. Appl. No. 13/360,378, Jan. 27, 2012, Zhang.
U.S. Appl. No. 13/370,186, Feb. 9, 2012, Wang et al.
U.S. Appl. No. 13/371,293, Feb. 10, 2012, Zhang et al.
Non-Final Office Action dated Mar. 5, 2012 for U.S. Appl. No. 12/644,888.
Final Office Action dated Sep. 10, 2012 for U.S. Appl. No. 12/644,888.
U.S. Appl. No. 13/551,541, Jul. 17, 2012, Yang et al.
U.S. Appl. No. 13/633,788, Oct. 2, 2012, Wang et al.

\* cited by examiner

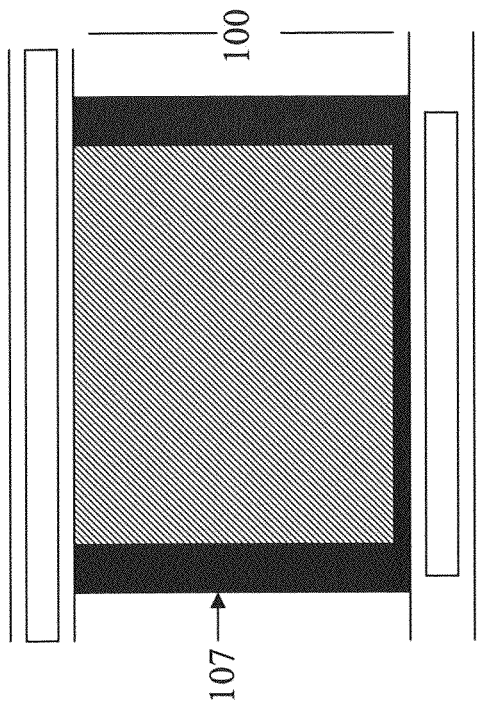
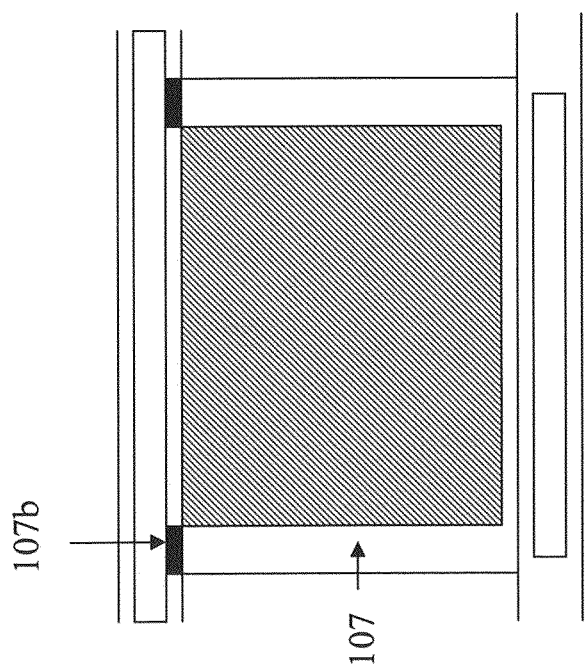
Figure 6b
Figure 6a

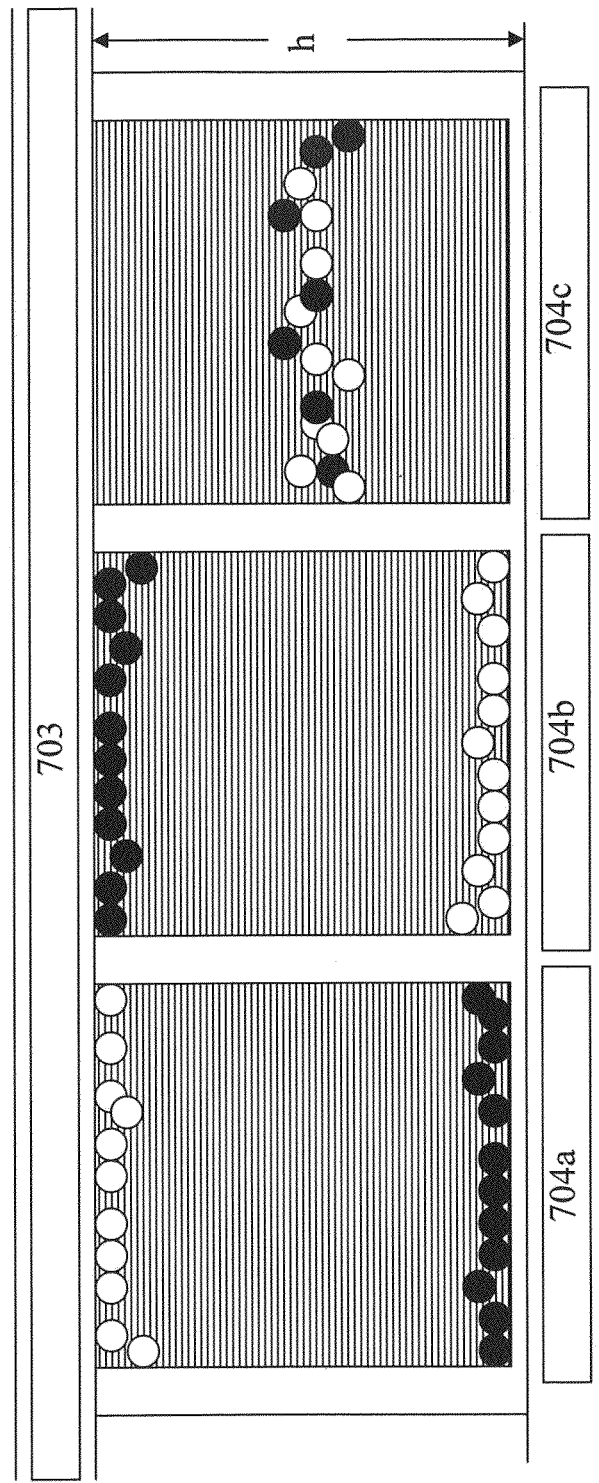

HIGHLIGHT COLOR DISPLAY ARCHITECTURE USING ENHANCED DARK STATE

This application claims priority to U.S. Provisional Application No. 61/141,574, filed Dec. 30, 2008; the content of which is incorporated herein by reference in its entirety.

FIELD OF THE INVENTION

The present invention is directed to highlight color display architecture using enhanced dark state.

BACKGROUND OF THE INVENTION

In order to achieve a highlight color display, color filters are often used. In one of the obvious options, each pixel has two sub-pixels and the two sub-pixels are based on two display cells capable of displaying black and white color states and only one of the sub-pixels has a color filter overlaid on top of a display cell. When a color state (e.g., red, green or blue) is desired, the sub-pixel with the color filter is turned on and the sub-pixel without a color filter is turned to the white or black state. When the black state is desired, both sub-pixels are turned to the black state. When the white state is desired, the sub-pixel without a color filter is turned white and the sub-pixel with a color filter is turned black. It is fairly obvious that the disadvantage of such a technique is that the maximum reflectivity of the white state is only 50% since the sub-pixel with the color filter must be turned black for that state. Conversely the color state is of a dark shade (with the black turned on) or a light shade (with the white turned on).

An alternative technique utilizing a dual switching mode is proposed in U.S. Pat. No. 7,046,228. With the dual switching mode, an extra set of electrodes are added to each microcup so that the microcup can be switched into three states; white (with the particles at top), colored (with the particles at bottom), and black (with the particles moved to the sides). A black background layer is used so when the particles are moved sideways, the black state shows through the microcup. The advantage of this is that high quality white and black states can be achieved. In addition, each microcup defines a pixel and no sub-pixels are required. However, a special electrode structure is needed for this dual mode switching.

SUMMARY OF THE INVENTION

The present invention is directed to an alternative design of a highlight color display. One of the key features of the invention is the intense color of the display fluid filled in the microcups, which allows the dark state to appear black. The advantage is that no sub-pixel architecture is required in the active matrix array or the microcup structure. Only one display fluid is needed for all microcups. Furthermore, there is no alignment required between the pixel electrodes and the microcups. In practice, a standard active matrix array may be used to drive the display device.

One aspect of the invention is directed to a color display device, which comprises a plurality of microcups wherein
 a) the microcups are separated by partition walls;
 b) the microcups are filled with a display fluid comprising white charged pigment particles dispersed in a solvent of a dark color;
 c) the microcups are sandwiched between a first layer and a second layer wherein the first layer comprises a common electrode and the second layer comprises a plurality of pixel electrodes; and
 d) each of the microcups is capable of displaying a white color state, a dark color state and a medium color state.

In this aspect of the invention—In one embodiment, the color display further comprises an adhesive layer of a dark color or a color complementary to the color of the solvent. In another embodiment, the top surface of the partition walls is of a dark color or a color complementary to the color of the solvent. In a further embodiment, the partition walls are of a black or dark color. In one embodiment, no more than 10%, preferably no more than 3%, of the light is reflected at the peak transmission of the dark color state. In one embodiment, the dark color of the solvent is dark red, dark green or dark blue. In one embodiment, the reflectance of the medium color state achieved by driving the white charged pigment particles to an area between the common electrode and the pixel electrode in the microcup has at least five times, preferably at least ten times, the reflectance of the dark color state. In one embodiment, the microcups and the pixel electrodes are aligned. In another embodiment, the microcups and the pixel electrodes are un-aligned. In one embodiment, the medium color state is achieved by driving the white pigment particles to an area between the common electrode and the pixel electrode. In one embodiment, the particles are distributed throughout the display fluid. In another embodiment, the particles are driven to be at the mid-level in the microcup. In one embodiment, each microcup represents a pixel. In one embodiment, the device further comprises an active matrix driving system.

Another aspect of the invention is directed to a color display device, which comprises a plurality of microcups wherein
 a) the microcups are filled with a display fluid comprising black and white charged particles carrying charges of opposite polarities and dispersed in a clear and colored solvent;
 b) the microcups are sandwiched between a first layer and a second layer wherein the first layer comprises a common electrode and the second layer comprises a plurality of pixel electrodes; and
 c) each of the microcups is capable of achieving a white state, a black state and a color state.

In this aspect of the invention—In one embodiment, the colored solvent is red, green or blue respectively. In one embodiment, the microcups and the pixel electrodes are aligned. In another embodiment, the microcups and the pixel electrodes are un-aligned. In one embodiment, the color state is achieved by driving both the white and black charged pigment particles to an area between the common electrode and the pixel electrode. In one embodiment, the particles are distributed throughout the display fluid. In another embodiment, the particles are driven to be at the mid-level in the microcup. In one embodiment, the color state achieved by driving both the white and black charged pigment particles to an area between the common electrode and the pixel electrode has a reflectance at least five times, preferably at least ten times, the reflectance of the black state. In one embodiment, each microcup represents a pixel. In one embodiment, the device further comprises an active matrix driving system.

BRIEF DISCUSSION OF THE DRAWINGS

FIGS. 6a and 6b are alternative designs to impart a dark color to the partition wall area.

FIGS. 7a-7c illustrate how different color states may be displayed with a two particle system.

DETAILED DESCRIPTION OF THE INVENTION

Figure 1A:
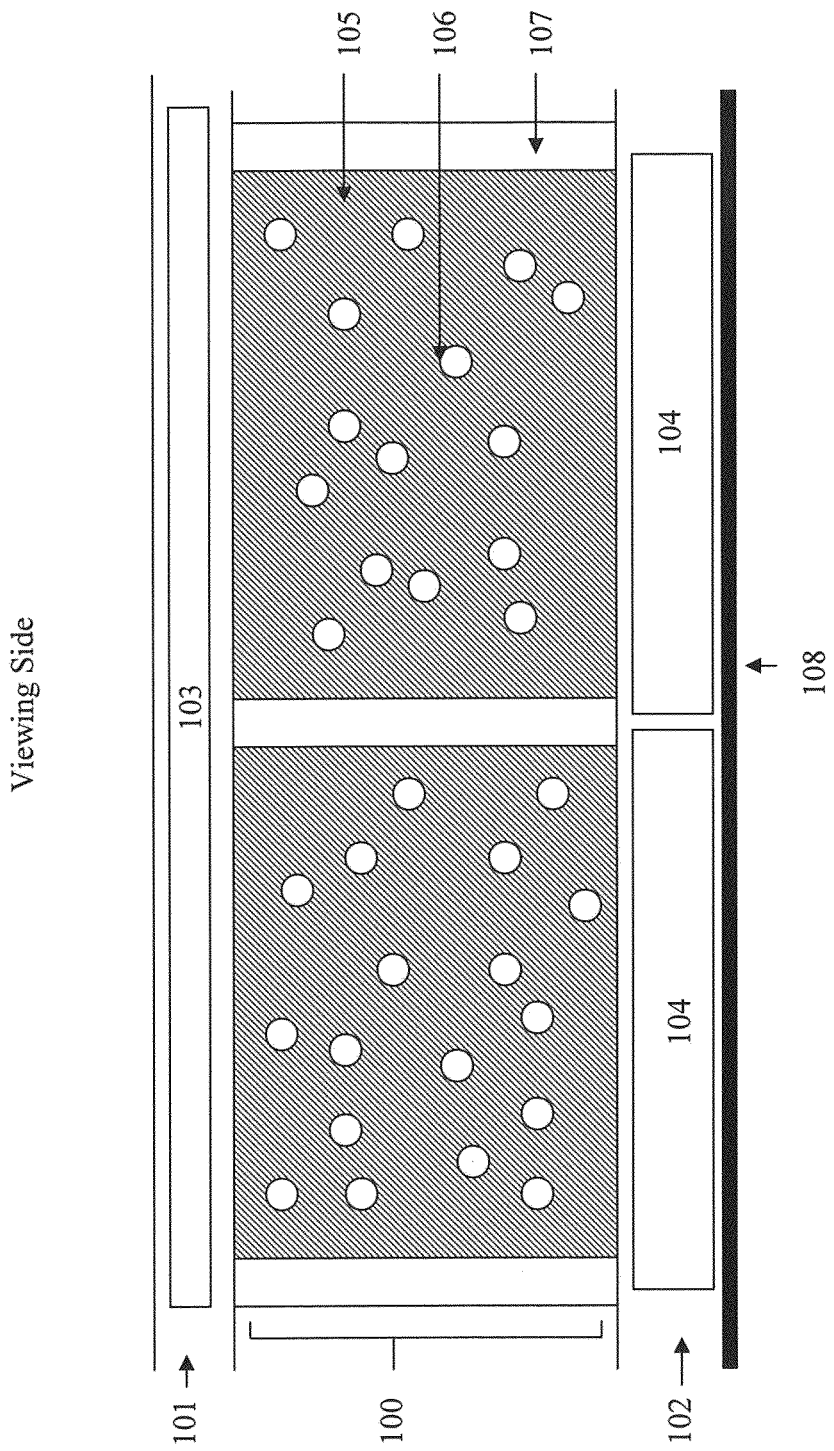
FIG. 1a depicts a cross-section view of a color display device of the present invention.

FIG. 1a depicts a cross-section view of a color display device of the present invention. A microcup (100) is sandwiched between a first layer (101) and a second layer (102). The microcup (100) is surrounded by partition walls (107). The first layer comprises a common electrode (103). The second layer comprises multiple pixel electrodes (104).

The microcup (100) is a micro-container filled with a display fluid (105). Details of the term "microcup" are given in U.S. Pat. No. 6,930,818, the content of which is incorporated herein by reference in its entirety.

While microcups are specifically mentioned in the present application, it is understood that any micro-containers (e.g., microcapsules), regardless of their shapes or sizes, are within the scope of the present application, as long as the micro-containers are filled with a display fluid and have the same functions as the microcups.

In one embodiment of the invention, the display fluid (105) is an electrophoretic fluid comprising only one type of charged pigment particles (106), usually white, dispersed in a colored dielectric solvent or solvent mixture, as shown in FIG. 1a. The color of the electrophoretic fluid (or the color of the dielectric solvent or solvent mixture) may be a dark red, dark green, dark blue or another dark color. For a highlight display device, the display fluid in all of the microcups is of the same color. The color of the fluid is dark enough that when the white particles are at the bottom, preferably not more than 10%, more preferably not more than 3%, of the light is reflected at the peak transmission of the dark color state.

In another embodiment, the electrophoretic fluid may comprise two types of pigment particles of contrasting colors and carrying opposite charge polarities. The pigment particles are also dispersed in a colored solvent and the display fluid in all of the microcups is of the same color. However, in the two particle system, the color of the solvent does not have to be enhanced.

The display device may also have an adhesive layer (108) at the opposite side of the viewing side. The adhesive layer is colored and the first layer, the second layer and the partition walls (107) are all transparent. The purpose of the colored adhesive layer is to balance the color of the dark color state or enhance the black state. The adhesive layer may be of the black color or a dark color complementary to the color of the display fluid. In the latter case, if the microcups are filled with a display fluid of a dark red color, the dark color state will have a tinge of red. In this case, the adhesive layer may be of a combined color of dark green and dark blue. The dark green and dark blue colors from the adhesive layer through the partition walls and the red color from the display fluid together will provide a neutral dark color.

Likewise, if the microcups are filled with a display fluid of a dark green color, the adhesive layer then may be of a combined color of dark red and dark blue (complementary color). If the microcups are filled with a display fluid of a dark blue color, the adhesive layer then may be of a combined color of dark red and dark green (complementary color). As shown, the adhesive layer has the function of enhancing the dark color state displayed by the display device. Suitable pigments or dyes are added to the adhesive layer to achieve the desired color of the adhesive layer.

Figure 1B:
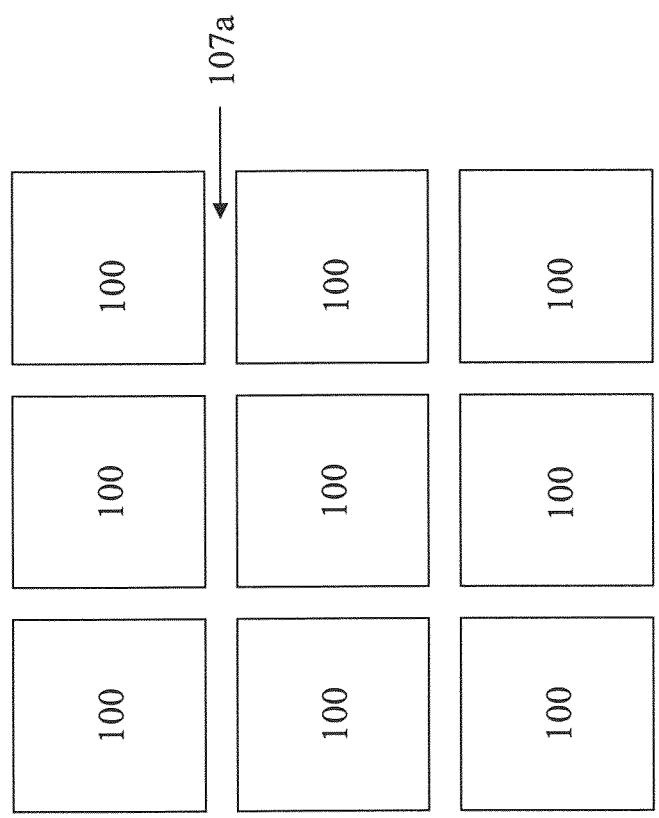
FIG. 1b depicts a top view of microcups.

FIG. 1b depicts a top view of microcups (100). The area between the microcups is the wall area (107a). In the context of the present invention, the total microcup area (100) takes up a relatively large percentage of the total area, preferably in the range of at least 80%, more preferably in the range of at least 90%.

The common electrode (103) is usually a transparent electrode layer (e.g., ITO), spreading over the entire top of the display device. The pixel electrodes (104) are described in U.S. Pat. No. 7,046,228, the content of which is incorporated herein by reference in its entirety.

It is noted that while active matrix driving electrodes are mentioned as pixel electrodes, the scope of the present invention encompasses other types of electrode addressing as long as the electrodes serve the desired functions.

The second layer (102) comprises multiple pixel electrodes (104). However, the pixel electrodes and the microcups may be aligned (see FIG. 1a). In an aligned design, each pixel electrode corresponds to one microcup.

Figure 2A:
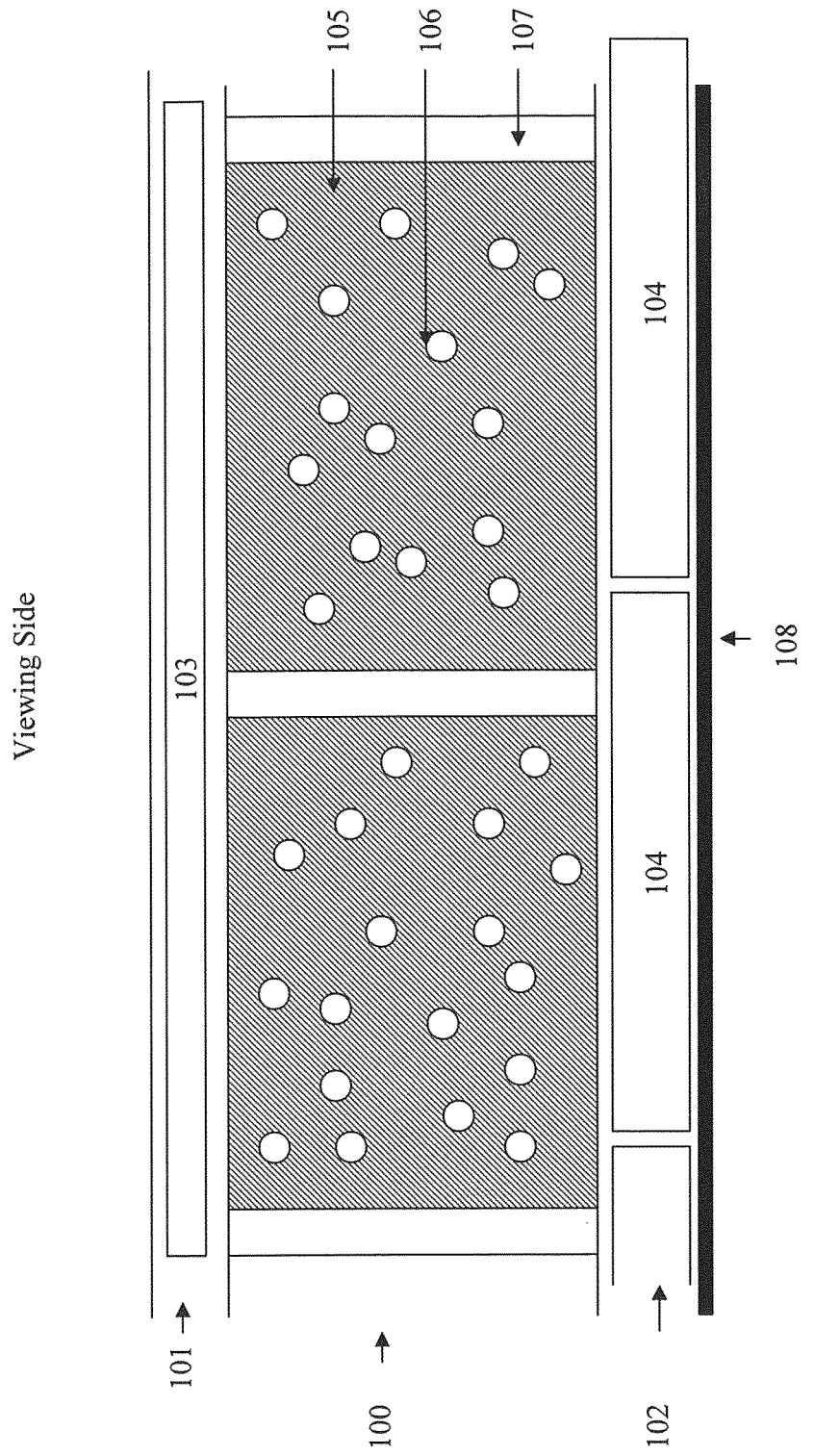
FIGS. 2a, 2b and 2c depict un-aligned designs.

FIG. 2a shows an un-aligned design. The term "un-aligned" or "non-aligned", in the context of this invention, is intended to mean that at least one pixel electrode (104) is permitted to be underneath more than one microcup, as shown in the figure.

There is no requirement that the shape, size or alignment of pixel electrodes match those of the microcups.

Figure 2C:
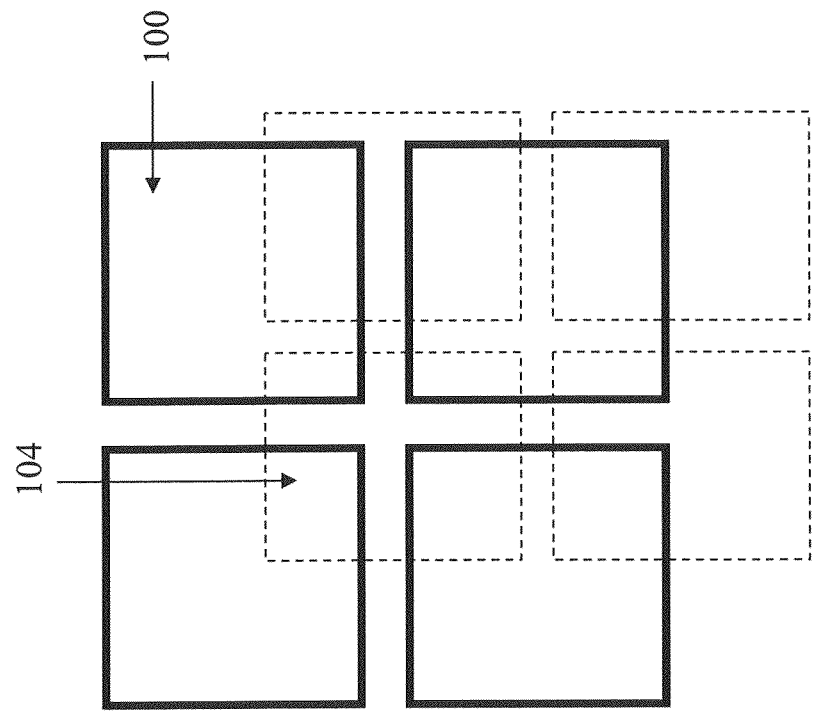
Figure 2B:
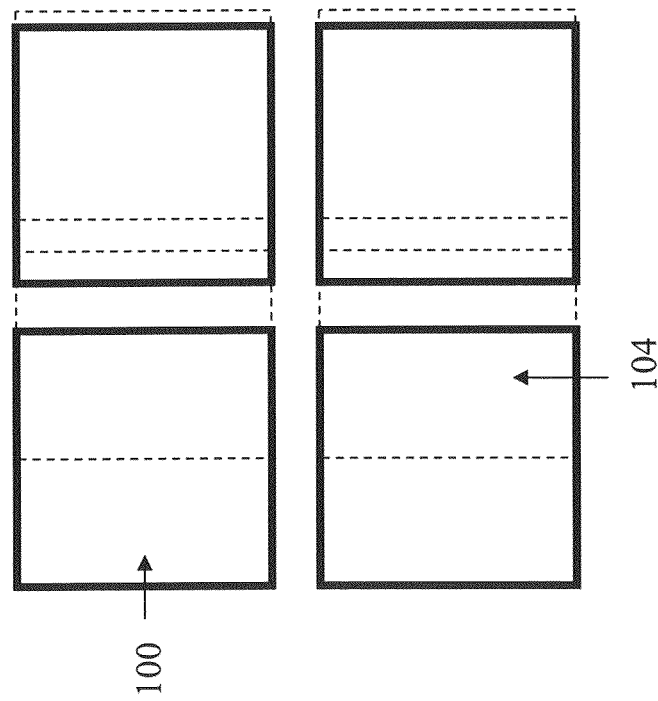

FIG. 2b is a top view of an un-aligned design. In this figure, the microcups (solid lined, 100) and the pixel electrodes (dotted lined, 104) are un-aligned in only one direction and each pixel electrode is underneath two neighboring microcups.

FIG. 2c is a top view of another un-aligned design. In this figure, the microcups (solid lined, 100) and the pixel electrodes (dotted lined, 104) are un-aligned in both directions and each pixel electrode is underneath four neighboring microcups.

The term "un-aligned" or "non-aligned" is not limited to the examples of FIGS. 2b and 2c. In fact, the term "un-aligned" or "non-aligned" would broadly encompass all configurations in which at least one pixel electrode is underneath more than one microcup. In other words, the "un-aligned" or "non-aligned" would also include configurations with microcups and/or pixel electrodes having irregular shapes, sizes or spatial arrangements.

Figures 3A, 3B, 3C:
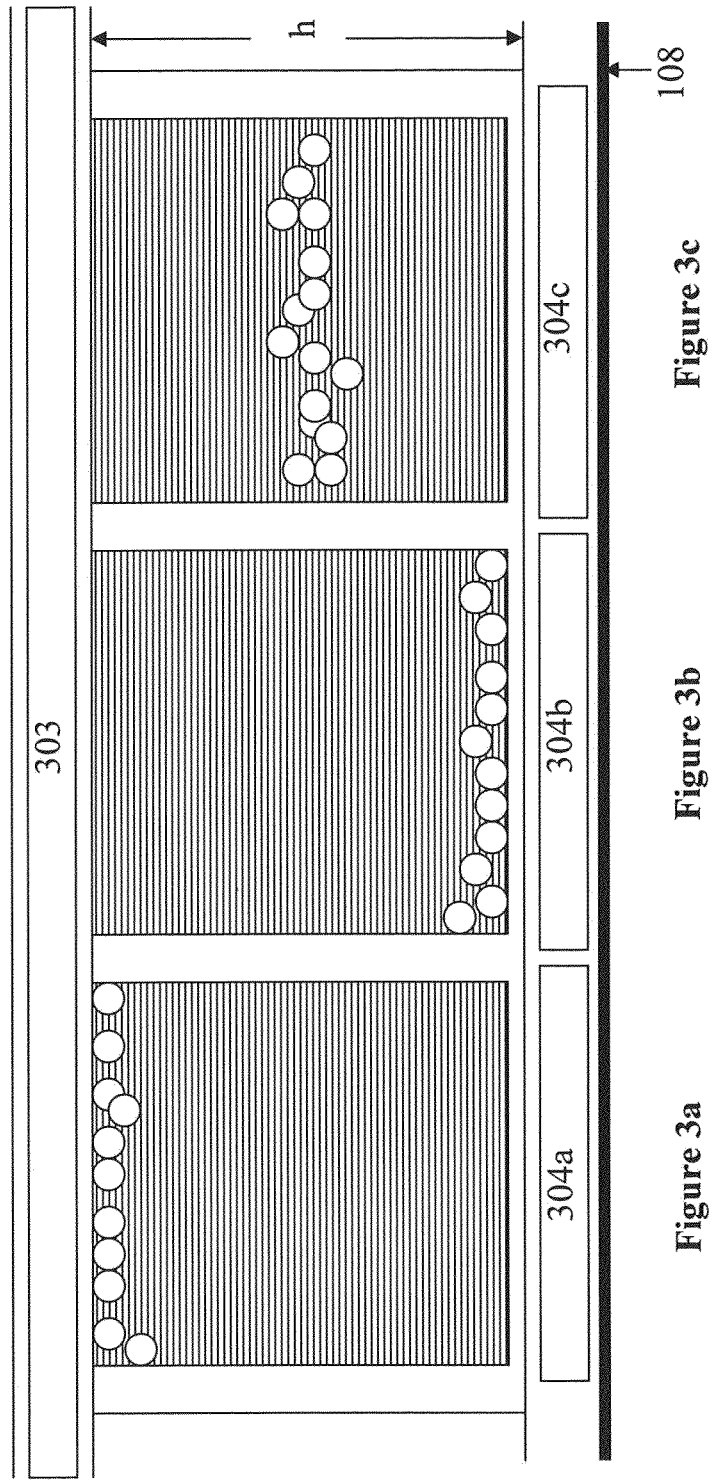
FIGS. 3a-3c illustrate how different color states may be displayed.

FIGS. 3a-3c illustrate how different color states may be displayed. In this example, the display fluid comprises charged white pigment particles dispersed in a dark blue solvent. The display fluid is of the same color in all microcups.

In FIG. 3a, by applying appropriate voltages to the common (303) and pixel (304a) electrodes, the white particles move to be near or at the common electrode (303). As a result, the white color is seen at the viewing side.

In FIG. 3b, by applying appropriate voltages to the common (303) and pixel (304b) electrodes, the white particles move to be near or at the pixel electrode (304b). Because the blue dye absorption is strong, the color seen in this case is a very dark blue color. At a high enough level of the blue density, such a pixel will appear black to the viewers. As described previously, if the fluid is not dark enough, the color will appear black if the fluid color is balanced by the complementary colors in the adhesive layer 108.

In the context of the present invention, when the particles are driven to an area between the common electrode and the pixel electrode, the particles may be distributed throughout the display fluid or a substantial amount of the particles may gather at the mid-level in a microcup. A "substantial amount," as used herein, refers to at least 60%, preferably 75%, more preferably 90%, of the particles. "The mid-level," as used herein, refers to the area between 20 and 80%, preferably 30 and 70%, more preferably 40 and 60% of the height (h) of a microcup. In any case, the reflectance of the medium color achieved by driving the particles to an area between the common and pixel electrodes is at least 5 times, more preferably at least 10 times, the reflectance of the dark color state achieved by driving the particles to be at or near the pixel electrode.

By properly adjusting the timing (i.e., duration) of a driving waveform, the white particles may move to be in an area between the common electrode and the pixel electrode (e.g., at the mid-level of the microcup), as shown in FIG. 3c. In this scenario, the white particles are distributed in the middle of the microcup and the reflected color appears to be medium blue.

In the white state as shown in FIG. 3a or the middle level color state as shown in FIG. 3c, the much brighter color displayed would overwhelm the small amount of the dark color in the wall area to give the desired color appearance.

In another embodiment, it may also be desirable to mix a small amount of a black material (e.g., a mixture of red, green and blue dyes) with the blue color in the fluid in order to more easily achieve a good dark state.

Figure 4:
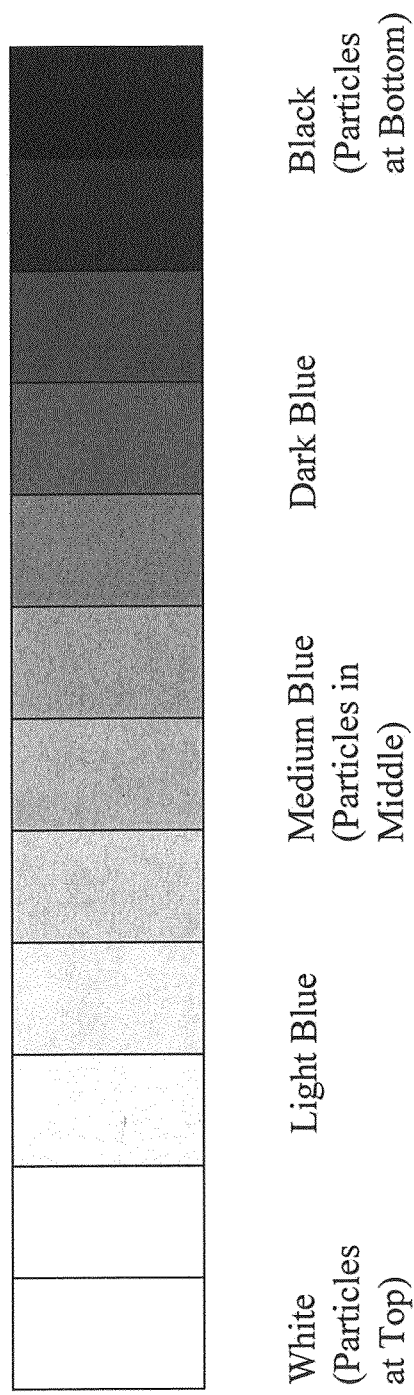
FIG. 4 shows a scale of colors which may be displayed by the color display of the present invention.

FIG. 4 shows a scale of colors which may be displayed by the color display of the present invention. The black state at the right end of the scale is achieved when the white particles are at or near the bottom of a microcup. The white state at the left of the scale is achieved when the white particles are at or near the top of a microcup. The blue color state in the middle of the scale is achieved when the white particles are distributed in an area between the common electrode and the pixel electrode (e.g., the mid-level in a microcup).

Figure 5:
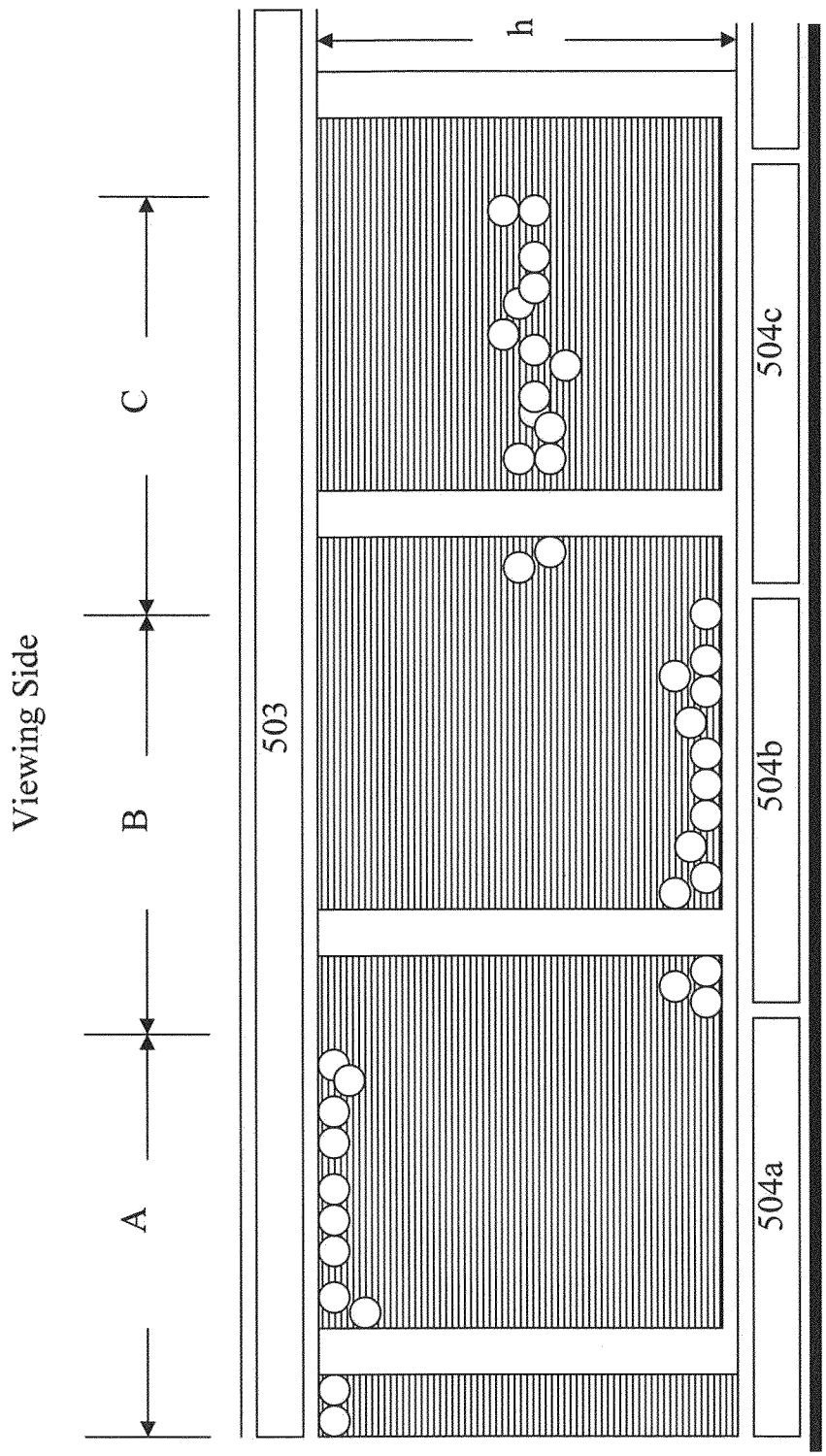
FIG. 5 shows how different color states may be displayed when the microcups and the pixel electrodes are not aligned.

FIG. 5 shows how different color states may be displayed when the microcups and the pixel electrodes are not aligned. In this example, the charged pigment particles are white and the color of the solvent in which the white particles are dispersed is a dark blue color. As shown, when appropriate voltages are applied to the common (503) and pixel electrodes (504a, 504b and 504c), the white pigment particles may move to be near or at the common electrode, near or at the pixel electrodes or in an area between the common electrode and the pixel electrode (e.g., the mid-level in a microcup). As a result, a white color (in area marked "A"), a dark blue (almost black) color (in area marked "B") or a medium blue color (in area marked "C") is seen from the viewing side. The dark colored wall area (due to the dark adhesive layer at the bottom of the display device) is negligible when the white or medium blue color is displayed because the wall area is much smaller than the fluid area.

As stated above, in order to achieve a dark level so dark that it appears black, an adhesive layer of a black or dark color is added at the bottom of the display device. The dark color seen through the partition walls may also be achieved by alternative designs. In one embodiment, the top surface (107b) of the partition walls (107) may be colored black or a dark color state, as shown in FIG. 6a. The black or a dark color may be applied to the top surface of the partition walls by methods as described in U.S. Pat. No. 6,829,078, the content of which is incorporated herein by reference in its entirety. The top surface of the partition walls may be of a dark color complementary to the dark color of the display fluid within the microcups. In other words, the top surface may be of a combined color of dark red and dark green, or a combined color of dark green and dark blue or a combined color of dark blue and dark green, depending on the color of the display fluid. Suitable pigments or dyes may be used to achieve the desired color of the top surface layer (107b).

In another embodiment, the partition wall (107) themselves may be of a black or dark color. This can be achieved by forming a microcup structure (100) in a black or dark color, as shown in FIG. 6b. In this option, suitable pigments or dyes may be added to the composition for forming the microcup structure.

In another embodiment, the walls are transparent and the colored adhesive layer is tuned to balance the color of the fluid in the dark state, thus achieving a good black state.

In another embodiment of the invention, the display fluid may comprise two types of pigment particles of contrast color dispersed in a clear and colored solvent. In this case, the color of the solvent does not have to be as dark as the color of the solvent in the one particle system. In addition, there is less need to balance the dark color in the black level, when one type of the particles is of the black color. In other words, there is less need to have the dark colored adhesive layer at the bottom of the display device, or the dark colored top surface of the partition walls or the dark colored microcup structure.

FIGS. 7a-7c illustrate how different color states may be displayed with this two particle system. In this example, the pigment particles are black and white and carry charges of opposite polarities. The color of the solvent is a blue color.

In FIG. 7a, the white particles are driven to be near or at the common electrode (703) and the black particles are driven to be near or at the pixel electrode (704a). As a result, the white color is seen at the viewing side.

In FIG. 7b, the black particles are driven to be near or at the common electrode (703) and the white particles are driven to be near or at the pixel electrode (704b). As a result, the black color is seen at the viewing side.

In FIG. 7c, both the black and white particles are driven to an area between the common electrode and the pixel electrode (about the mid-level of a microcup). As a result, a blue color is seen at the viewing side.

In one embodiment, the reflectance of the color state achieved by driving the black and white particles to an area between the common and pixel electrodes is at least 5 times, more preferably at least 10 times, the reflectance of the black color state achieved by driving the white particles to be at or near the pixel electrode.

Figure 8:
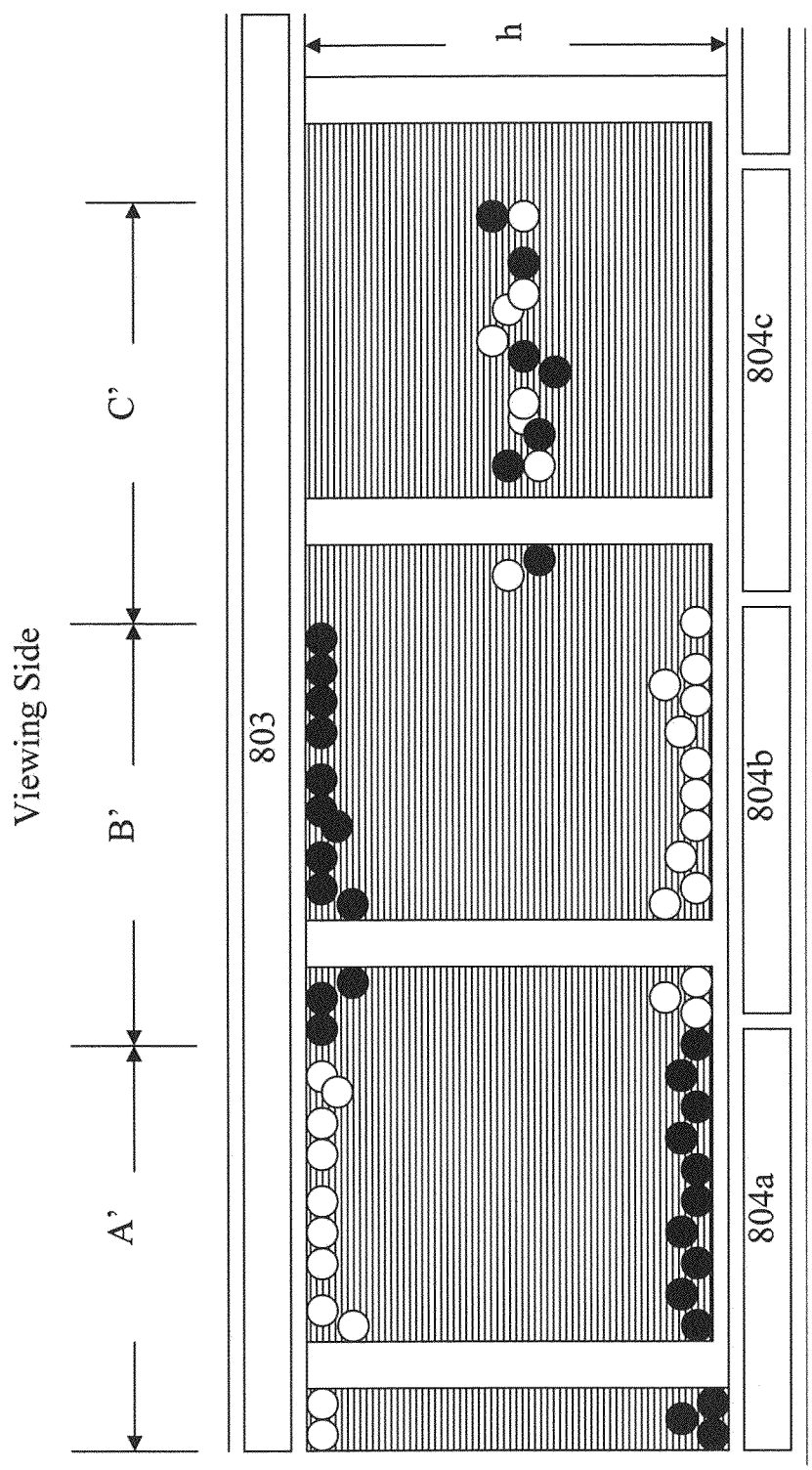
FIG. 8 shows how different color states may be displayed with a two particle system and an un-aligned design.

The two particle system is also applicable to the non-aligned design. FIG. 8 shows an example. In this example, the pigment particles are black and white and the color of the solvent in which the white particles are dispersed is blue. The black and white particles carry charges of opposite polarities. As shown, when appropriate voltages are applied to the common (803) and pixel electrode (804a), the white pigment particles move to be near or at the common electrode (803) and the black pigment particles move to be near or at the pixel electrode (804a) to cause the white color to be seen at the viewing side (in area marked "A"). When appropriate voltages are applied to the common (803) and pixel electrode (804b), the black pigment particles move to be near or at the common electrode (803) and the white pigment particles move to be near or at the pixel electrode (804b) to cause the black color to be seen at the viewing side (in area marked "B"). When appropriate voltages are applied to the common (803) and pixel electrode (804*c*), both the white and black pigment particles move to be in an area between the common and pixel electrodes (about the mid-level of a microcup) to cause a medium blue color to be seen at the viewing side (in area marked "C").

In a highlight color display of the present invention, each microcup defines a pixel as it is capable of displaying three color states, black, white and color (e.g., red, green or blue). No sub-pixels are needed.

Figures 9A, 9B, 9C:
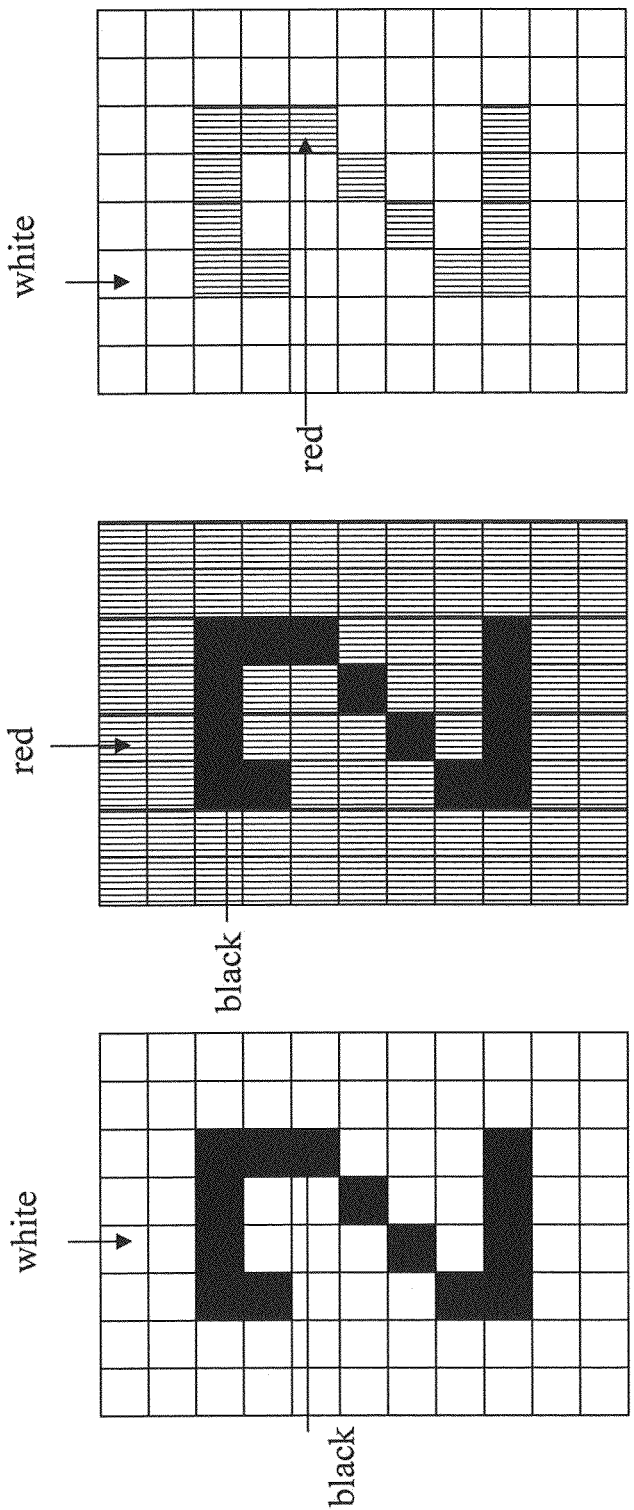
FIGS. 9a-9c show highlight options.

FIGS. 9*a*-9*c* show highlight options of the present invention. FIG. 9*a* shows a black image on a white background. In FIG. 9*b*, the black image is highlighted by the surrounding red color. In FIG. 9*c*, the image is highlighted by being switched to the red color. Any color can, of course, be used besides the red used to describe the concept in this application.

The display device of the present invention may be manufactured by methods known in the art. For example, the microcup layer may be formed on a layer of pixel electrodes followed by laminating a common electrode layer over the microcup layer, as described in U.S. Pat. No. 6,930,818. For the non-microcup type display devices, they may also be manufactured by methods known in the art.

EXAMPLE

Figure 10A:
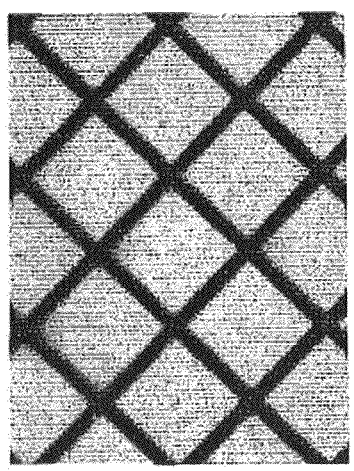
FIGS. 10a-10c show photographs taken under a microscope of microcups displaying different color states.
Figure 10B:
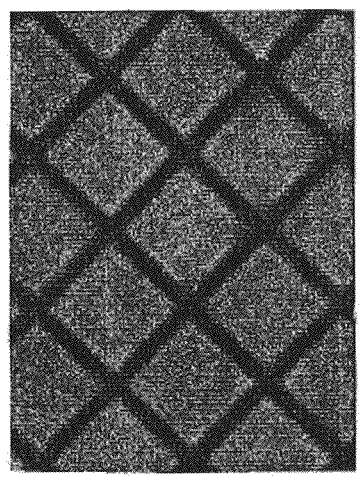
Figure 10C:

FIGS. 10*a*-10*c* show photographs taken under a microscope of microcups displaying the white color (FIG. 10*a*), a medium blue color (FIG. 10*b*) and a blue color dark enough to appear black (FIG. 10*c*). In the experiment, white charged particles are dispersed in a dark blue solvent. The black lines indicate the partition wall area. The black lines are more pronounced in the photographs because these are enlarged images. In practice, the dark lines would not be visually detectable by a viewer.

The Dmax of the blue display fluid was 1.43 and the contrast ratio demonstrated by the color display was about 11.8, assuming 35% white.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A color display device comprising
A) a plurality of microcups, wherein
a) said microcups are separated by transparent partition walls,
b) said microcups are filled with a display fluid comprising white charged pigment particles dispersed in a solvent of a dark color, and the solvent is of the same color in all the microcups, and
c) said microcups are sandwiched between a first layer and a second layer wherein said first layer comprises a common electrode and is on a viewing side and said second layer comprises a plurality of pixel electrodes, and
B) an adhesive layer on the opposite side of the viewing side and the adhesive layer has a black color or a color complementary to the dark color of the solvent,
whereby each area corresponding to a pixel electrode displays a white color state when the white charged pigment particles are driven to be near or at the common electrode, displays a black color state when the white charged pigment particles are driven to be near or at the pixel electrode to cover the pixel electrode, wherein the black color state is the dark color of the solvent enhanced by the color of the adhesive layer seen through the transparent partition walls, and displays a medium color state of the solvent when the white charged pigment particles are driven to an area between the common and pixel electrodes.

2. The color display device of claim 1, further comprising an adhesive layer of a dark color or a color complementary to the color of the solvent, and the adhesive layer is at the opposite side of the viewing side of the display device.

3. The color display device of claim 1, wherein the top surface of the partition walls is of a dark color or a color complementary to the color of the solvent.

4. The color display device of claim 1, wherein the partition walls are of a black or dark color.

5. The color display device of claim 1, wherein no more than 10% of the light is reflected at the peak transmission of the dark color state.

6. The color display device of claim 5, wherein no more than 3% of the light is reflected at the peak transmission of the dark color state.

7. The color display device of claim 1, wherein the medium color of the solvent has a reflectance at least ten times the reflectance of the dark color state.

8. The color display device of claim 1, wherein said microcups and said pixel electrodes are aligned.

9. The color display device of claim 8, wherein each microcup represents a pixel.

10. The color display device of claim 1, wherein said microcups and said pixel electrodes are un-aligned.

11. The color display device of claim 1, wherein said pixel electrodes are active matrix driving electrodes.

12. The color display device of claim 1, wherein the dark color of the solvent is dark red, dark green or dark blue.

* * * * *